Patented July 12, 1927.

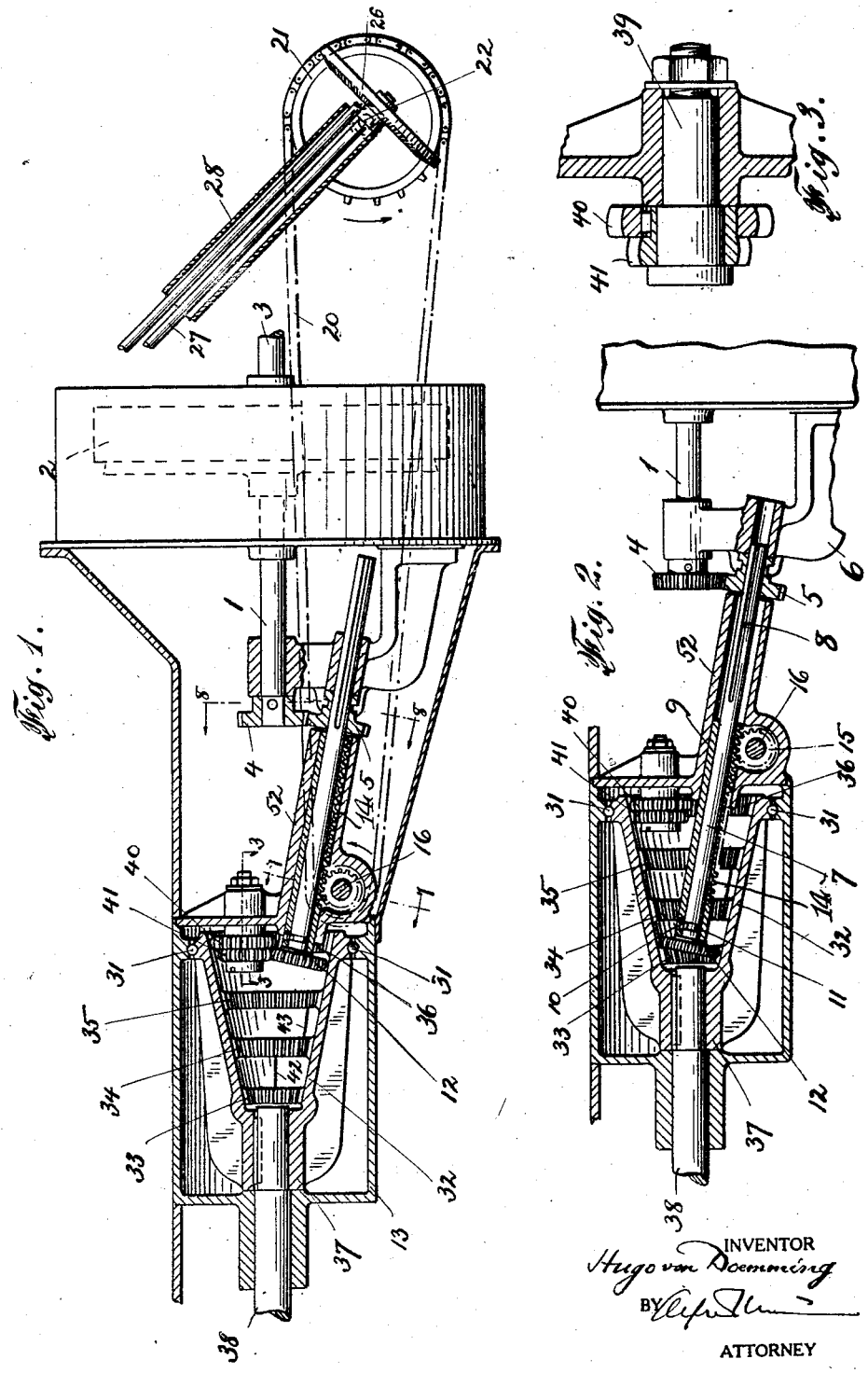

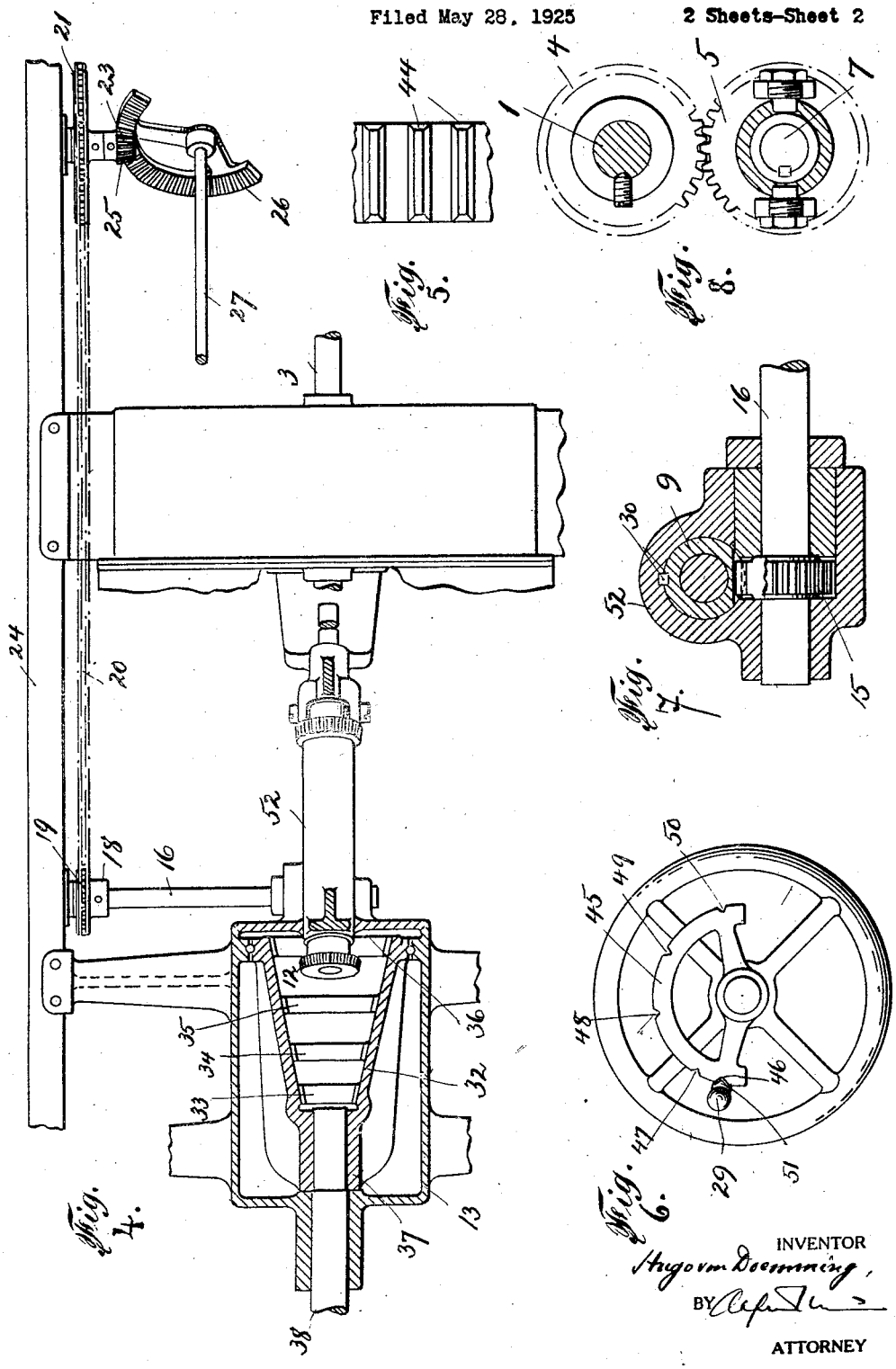

1,635,296

UNITED STATES PATENT OFFICE.

HUGO von DOEMMING, OF HILDESHEIM, GERMANY.

CHANGE-SPEED GEAR FOR AUTOMOBILES AND THE LIKE.

Application filed May 28, 1925. Serial No. 33,341.

My invention relates to change speed gears for use on automobiles, and the like. The object of my invention is to produce a change speed gear, which is operated from the steering column, and which is so designed that the changes are easily and positively effected. The change speed gear according to my invention is simple and compact in construction and includes means, whereby the change from one speed to another is noiselessly effected and without any danger of damage to the gear wheels.

In the accompanying drawing, in which I have shown my invention, by way of illustration, Fig. 1 is a sectional elevation of the change speed gear and associated parts, Fig. 2 a similar view as Fig. 1 showing certain parts of the gear in a different position, Fig. 3 a detail view of a portion of the gear in section along line 3—3 in Fig. 1, but drawn to a larger scale, Fig. 4 a top plan view, partly in section, Fig. 5 a detail view showing the shape of the internal teeth used in my gear, Fig. 6 a top view of the steering wheel at the head of the steering column, Fig. 7 a section along line 7—7 in Fig. 1 and Fig. 8 a section along line 8—8 in Fig. 1, drawn to a larger scale.

The shaft indicated at 1 in Fig. 1 and coupled in the usual manner by the conical friction coupling 2 with the engine shaft 3 carries at its rear end the toothed bevel gear wheel 4, which is in mesh with a toothed bevel gear wheel 5 rotatably mounted on the bracket 6. Slidingly connected with the bevel wheel 5 and passing centrally therethrough is a shaft 7 which is guided in the said bracket 6 and is provided with a groove 8 adapted to receive a pin projecting from the hub of the bevel wheel 5, thereby rotatably connecting the latter and the shaft 7. The latter carrying a toothed wheel 12 is rotatably journalled in a sleeve 9, which is connected with the shaft 7 through a pin 10 entering a circular groove 11 in the shaft 7 so as not to interfere with its rotation. The sleeve 9 is adapted to slide axially back and forth in a tube-like extension 52 of the gear casing 13, and because of the pin and groove connection 10, 11, the shaft 7 participates in the sliding movements of the sleeve 9. On the lower face of the latter are formed rack-teeth 14 into which engage the teeth of a spur wheel 15 mounted on a transverse shaft 16 journalled at one end in an enlarged portion 17 of the gear casing 13 and at the other end in a bearing 18. At this latter end, the shaft 16 carries a small sprocket wheel 19, which through a sprocket chain 20 is coupled with a larger sprocket-wheel 21 on a stub-shaft 22 mounted in bearing 23. Both the bearing 18 and the bearing 23 are supported by the longitudinal member 24 of the chassis. The stub-shaft 22 carries at its free end a toothed bevel wheel 25 in mesh with a larger bevel wheel 26 mounted at the lower end of a spindle 27 enclosed in the steering column 28. To the upper end of spindle 27 is secured a lever arm 29 (Fig. 6) whereby the spindle 27 may be turned about its longitudinal axis to rotate the toothed bevel wheel 26 in either direction, which rotation, through the sprocket-wheel 21, chain 20, and sprocket-wheel 19 is transmitted to the shaft 16 and thereby to the spur-wheel 15 which, as clearly shown in Figs. 1 and 2, engages the rack-teeth on the under side of sleeve 9, so that upon the rotation of the wheel 15, the said sleeve and together with it the shaft 7, rotatably journalled in the sleeve, are longitudinally moved forwards or backwards depending on the direction of rotation of the wheel 15. The sleeve 9 is held against rotation within the tubular extension 52 by a key and groove arrangement 30 shown in Fig. 7. In the gear casing 13 there is rotatably journalled on ball-bearings 31 a funnel-shaped hollow member 32 provided with four sets of internal toothed gears 33, 34, 35, 36 cut into the inner wall of the funnel 32. The hub 37 of the funnel 32 is secured to the Cardan shaft 38 leading to the differential gear (not shown). The internal gears 33, 34, 35 correspond to the different speed ratios: high, intermediate and low speed, whereas the internal gear 36 is for reverse. It is obvious that when the shaft 7, together with sleeve 9 is moved longitudinally within the tubular extension 52 towards the left in Figs. 1 and 2, the toothed wheel 12 at the end of shaft 7 is successively brought in mesh first with the internal gear 35 (low speed), then with the internal gear 34 (intermediate speed) and finally with the internal gear 33 (high speed), which latter position is shown in Fig. 2, whereas in the position shown in Fig. 1 the entire gear is in reverse. According to Fig. 1, there are mounted on a stub-shaft 39 (shown in Fig. 3) two toothed idler wheels 40, 41, the wheel 40 being in mesh with the internal gear 36.

When the shaft 7 has been moved to its extreme end position, shown in Fig. 1, the toothed wheel 12 will be in engagement with the toothed wheel 41, and by transmitting its rotation thereto and to the wheel 40 connected therewith will rotate the funnel 32, and thereby the shaft 38 in an anti-clockwise direction. The gear, therefore, is now in reverse.

As shown in Fig. 1, two teeth of the internal gears 33, 34 and likewise two teeth of the internal gears 34, 35, are connected on opposite sides of the funnel 32 by elongated intermediate teeth 42 and 43 respectively, two such teeth only being visible in Fig. 1. In this way, the toothed wheel 12 will be caused to slide noiselessly from one of the said internal gears into the other and without any danger of damage to the gears. When the toothed wheel 12 occupies the position between the internal gears 36 and 35, the entire gear is in "neutral."

Fig. 5 shows the shape of the teeth of the internal gears. The teeth, as seen in said figure are chamfered at their ends as shown at 44, so as to cause the toothed wheel 12 to easily enter in mesh with said teeth.

In Fig. 6 is shown a quadrant or sector 45 situated above the steering wheel and provided with notches 46, 47, 48, 49, and 50 corresponding to the various positions of the change speed gear. With these notches there cooperates a pointer 51 on the lever arm 29. In the position shown in Fig. 6, in which the pointer 51 is opposite notch 46, the change speed gear is in reverse, whereas the notches 47, 48, 49 and 50 respectively represent "neutral", first, second and third speed.

I wish it to be understood that I am not limiting myself to the construction and the details as shown, since obviously many modifications can be made without departure from the gist of my invention.

I claim:

1. In a change-speed gear for automobiles, and the like, the combination with the steering column, the driving shaft, the driven shaft and bearings for the said shafts, of a conical hollow member secured to the said driven shaft and having a series of internal gears of progressively increasing diameter cut therein, a casing enclosing the said hollow member and having a tubular extension, a longitudinally movable shaft rotatably journalled in said extension, a means for longitudinally moving the said last-named shaft, a toothed wheel carried thereby adapted to mesh with any of the said internal gears, a means intermediate the said driving and longitudinally movable shafts for rotating the latter, a means positively operated from the said steering column for causing the longitudinal to and fro movements of the said movable shaft, an idler gear in mesh with one of the said internal gears to reverse the rotation of the said conical member, a non-rotatable sleeve slidably arranged in the said tubular extension and enclosing the said movable shaft being operatively connected therewith, the said sleeve having rack-teeth provided thereon, a pinion in mesh with the said rack teeth, and a transverse shaft carrying the said pinion.

2. In a change-speed gear for automobiles, and the like, the combination with the steering column, the driving shaft and the driven shaft, and bearings therefor, of a conical hollow member secured to the said driven shaft and having a series of internal gears of progressively increasing diameter cut therein, a casing enclosing the said member and having a tubular extension, a sleeve slidably arranged in the said extension being prevented from rotation therein and having rack teeth thereon, a rotatable shaft in said sleeve being operatively connected therewith, a toothed wheel on the said shaft adapted to mesh with any of the said internal gears, a means between the said driving and rotatable shafts for rotating the latter, a pinion in mesh with the said rack teeth, a rotatable transverse shaft carrying the said pinion, a rotatable spindle enclosed in the said steering column, a lever arm on the projecting upper end of the said spindle, bearings for the said spindle, means intermediate the said rotatable spindle and the said transverse shaft for transmitting the rotation of the former to the latter, a rotatable idler gear in constant mesh with the largest of the said internal gears, a sector provided on the said steering column and having notches therein corresponding to the various positions of the said toothed wheel relative to the internal gears in the said conical member, and a pointer on the said lever arm adapted to cooperate with the said notches.

3. The combination as specified in claim 2, comprising a ball-bearing between the inner end of the said casing and the widest portion of the said conical member, the said casing having a cylindrical extension forming a bearing for the inner end of the said driven shaft.

In testimony whereof I affix my signature.

HUGO von DOEMMING.